(12) United States Patent
Egeland

(10) Patent No.: US 9,085,948 B2
(45) Date of Patent: Jul. 21, 2015

(54) METHOD AND SYSTEM FOR TESTING A MULTIPLEXED BOP CONTROL SYSTEM

(75) Inventor: Olav Egeland, Trondheim (NO)

(73) Assignee: MARINE CYBERNETICS AS, Tiller (NO)

( * ) Notice: Subject to any disclaimer, the term of this patent is extended or adjusted under 35 U.S.C. 154(b) by 262 days.

(21) Appl. No.: 13/810,767

(22) PCT Filed: Jul. 15, 2011

(86) PCT No.: PCT/NO2011/000208
§ 371 (c)(1),
(2), (4) Date: Mar. 19, 2013

(87) PCT Pub. No.: WO2012/011820
PCT Pub. Date: Jan. 26, 2012

(65) Prior Publication Data
US 2013/0167944 A1    Jul. 4, 2013

Related U.S. Application Data

(60) Provisional application No. 61/365,535, filed on Jul. 19, 2010.

(30) Foreign Application Priority Data

Jul. 18, 2010 (NO) .................................. 20101024

(51) Int. Cl.
*E21B 34/02* (2006.01)
*E21B 33/064* (2006.01)
(Continued)

(52) U.S. Cl.
CPC ............... *E21B 34/02* (2013.01); *E21B 33/064* (2013.01); *E21B 47/1025* (2013.01); *G05B 17/02* (2013.01); *Y10T 137/0491* (2015.04); *Y10T 137/5983* (2015.04)

(58) Field of Classification Search
CPC ... E21B 33/064; E21B 34/02; E21B 47/1025; G05B 17/02
USPC ........... 166/336, 361, 363, 364, 250.01, 85.4; 251/1.1
See application file for complete search history.

(56) References Cited

U.S. PATENT DOCUMENTS 4,413,642 A * 11/1983 Smith et al. .................... 137/14
4,935,886 A     6/1990 Choka
(Continued)

FOREIGN PATENT DOCUMENTS

WO     WO 2008/127125 A2    10/2008

*Primary Examiner* — James G Sayre
(74) *Attorney, Agent, or Firm* — Birch, Stewart, Kolasch & Birch, LLP

(57) ABSTRACT

A test system and a method for testing a multiplexed BOP control system (6) wherein the multiplexed BOP control system (6) comprises a first and a second redundant central control unit (10, 20) with respective first and second operator consoles (30, 31), wherein the central control units (10, 20) are arranged for being connected via a first signal transmission system (40) to respective first and second redundant subsea control systems (11, 21) arranged for being connected to BOP valves (50) and BOP sensors (55) in a subsea BOP (1), and the test system comprises a control system signal simulator (42) arranged for being connected between one or more of the control units (10, 20) and one or more of the subsea control systems (11, 21), and further arranged for entirely or partly replacing the first signal transmission system (40) and providing simulated signals (41) between one or more of the control units (10, 20) and one or more of the subsea control systems (11, 21).

8 Claims, 4 Drawing Sheets

(51) Int. Cl.
*E21B 47/10* (2012.01)
*G05B 17/02* (2006.01)

(56) References Cited

U.S. PATENT DOCUMENTS

| | | | |
|---|---|---|---|
| 6,032,742 A * | 3/2000 | Tomlin et al. | 166/345 |
| 7,401,654 B2 * | 7/2008 | Franklin | 166/337 |
| 2003/0145994 A1 * | 8/2003 | Gatherar et al. | 166/339 |
| 2007/0100478 A1 | 5/2007 | Egeland et al. | |
| 2008/0185143 A1 * | 8/2008 | Winters et al. | 166/250.07 |
| 2008/0257559 A1 | 10/2008 | Grimseth et al. | |
| 2009/0101350 A1 | 4/2009 | O'leary et al. | |
| 2011/0253377 A1 * | 10/2011 | Barber et al. | 166/336 |

* cited by examiner

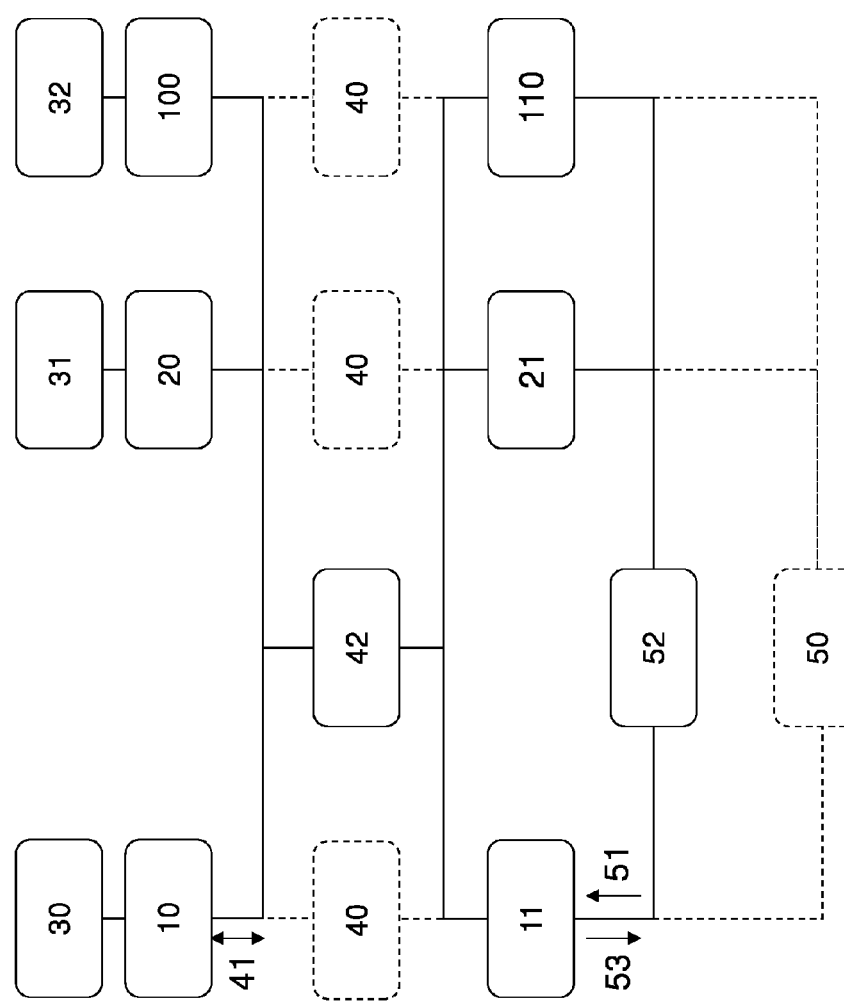

METHOD AND SYSTEM FOR TESTING A MULTIPLEXED BOP CONTROL SYSTEM

This application is the National Phase of PCT/NO2011/000208 filed on Jul. 15, 2011, which claims priority under 35 U.S.C. 119(e) to U.S. Provisional Application No. 61/365,535 filed on Jul. 19, 2010, and under U.S.C. 119(a) to Patent Application No. 20101024 filed in Norway on Jul. 18, 2010, all of which are hereby expressly incorporated by reference into the present application.

INTRODUCTION

The invention relates to blowout preventers in drilling of marine petroleum boreholes. Blow out preventers (BOP) are essential for safety in deep sea marine drilling operations. BOP's have complicated computer control systems, and it is of great importance to secure that these control systems perform adequately and effectively. Presently available testing methods are not sufficient to detect software errors in the computer control systems of the BOP's, and this may lead to problems that make it necessary to abort drilling operations and lift the BOP up from the seafloor to platform, or perform underwater repair. This will result in significant additional costs of drilling as the rig will be out of operation for one day or more. Moreover, software errors in the BOP control systems may lead to potentially dangerous situations that can cause a blowout.

The present invention proposes a new and efficient solution to this problem by introducing a simulator based test method and test system that improves test coverage for the software on the BOP control system.

BACKGROUND ART

The background of a Blow Out Preventer (BOP) will be given with reference to FIG. 1 of the drawings. The Blow Out Preventer (BOP) is a stack of valves. The primary function of the BOP is to open and close the well-bore. For drilling at deep waters with a floating installation (4), or an on-shore remote controlling installation the BOP is mounted on a wellhead (5) at the seafloor during drilling.

The subsea BOP stack of valves, will typically include;
An annular valve that closes the wellbore both when the wellbore is empty and when there is a drill pipe or casing in the drilling riser.
Pipe rams which are valves that close the BOP when there is a drill pipe in the wellbore.
Blind rams that are valves that close the wellbore when there is no drill pipe in the wellbore
Shear rams, which is a valve that cut off the drill pipe and closes the wellbore.
Drilling spool used to connect the choke line and the kill line.
An LMRP (Lower Marine Riser Package) (2) is mounted at the lower end of a marine riser (3), and is used to connect to the subsea BOP stack. The LMRP (2) has a stack of valves to control the opening and closing of the lower end of the marine riser (3).

In drilling operations the well is typically drilled by a rotating drill string lowered from the drilling rig through the marine riser (3). The drill string is hollow and comprises a series of connected drill pipe sections. Drilling mud is pumped down through the drilling string and out through the drill bit at the bottom of the well and out into the annular space in the borehole. The mud then flows back up to the rig through the annulus, which is the room between the drill string and the outer wall of the well, and back through the subsea BOP, and normally up through the drilling riser, and is returned to the floating installation (4).

The marine riser (3) is a relatively flexible pipe that forms a connection from the drilling floor on the rig to the subsea BOP mounted on the seafloor. The riser contains the drill string and the drilling mud returning through the annulus.

Deepwater drilling is typically done from floating vessels like a ship or a floating rig. Such floating vessels may be anchored, but for deep water the currently dominating practice is to use dynamic positioning where the floating vessel is kept in the desired position by a dynamic positioning system, which is a computer system that records the position as measured by position reference systems such as GPS receivers, taut-wires or hydro-acoustic systems.

ROV (Remotely Operated Vehicles) are underwater vessels with cameras and robotic arms, and a series of sensors such as pressure and heading sensors. ROV's are controlled and operated from the surface through a cable that supplies electrical energy and command signals to the ROV, and transfers camera images and sensor signals back to the surface.

Shallow water control systems may use a hydraulic system for signal transmission. Functions are activated using hydraulic fluid to activate the pilot on a pod, or control system valve. This solution can be used for water depths up to 5000 ft.

MUX (MUltipleXed) BOP control systems are commonly used for drilling at water depths over 3500 feet. In MUX BOP control systems electrical signals are transmitted from the platform to the BOP. Such systems typically use PLC's (Programmable Logic Controllers) on the platform that communicated with subsea electronics contained in water-tight pods on the subsea BOP. Such solution allow for the programming of logics functions and automatic sequencing of operations. Redundant hardware is used to improve reliability.

In addition the BOP control system will have Emergency BOP Control Capabilities, also called secondary intervention systems, which are activated automatically. This may include:

A so-called "Deadman" system is installed on the BOP independently from the subsea control systems and provides signals to shut in the wellbore without operator involvement in response to loss of communication with the surface.
Automatic Mode Function system that runs on the subsea pods or the subsea control systems and shuts in the wellbore without operator involvement in response to loss of communication with the surface.
Automatic shear functions
EDS (Emergency Disconnect System) is used on dynamically positioned rigs. The EDS is activated by the operator by pushing a button. The subsea BOP will then automatically go through a sequence of operations to prepare for the safe disconnection of the LMRP (2) from the subsea BOP. This may include the closing of the kill and choke valves, and the closing of the shear ram to cut the drill string.

Redundancy is used to improve reliability. At the same time redundancy increases the complexity of the in the computer system, and this may cause problems if this in turn leads to software or hardware errors because of a complicated design.

Interaction of secondary intervention systems that may be designed to do similar functions is another source of errors.

Disconnect of the LMRP (2) may reduce the hydrostatic mud weight on the wellhead (5), which may cause influx of formation fluids, that can lead to an undesired development of the well that can lead to a blow-out.

US patent application US 2009/0101350 A1 describes a system and method to allow backup or alternate fluid flow routes around malfunctioning components using removable, modular component sets. In one exemplary embodiment, an ROV establishes a backup hydraulic flow to a BOP function by attaching one end of a hose to a modular valve block and the other end to an intervention shuttle valve, thus circumventing and isolating malfunctioning components.

US Patent application 2008/0257559 A1 describes a hybrid process control system including electrical transmission of power to a sub-sea hydraulic power unit, which in turn provides hydraulic power for control of hydraulic actuators. A circulation system using small bore tubing in the umbilical cord in combination with a traditional topside hydraulic power unit provides for active control of hydraulic fluid quality with respect to contamination caused by the sub-sea hydraulic actuators, especially process gas from down hole safety valves.

US patent application 2008/0185143 A1 describes a method and apparatus for testing a blowout preventer (BOP) wherein a pressurization unit applies fluid to an isolated portion of the throughbore of the BOP. A signal that is representative of the actual pressure in the isolated portion of the throughbore over successive time points and a pre-determined non-deterministic finite state automaton are used to predict the pressure in the isolated portion of the throughbore as a function of time relative to a pre-determined acceptable leak rate and the time at which stability is achieved.

International patent application WO2008127125 A2 discloses a hardware in the loop test system and test method for testing drilling control systems.

U.S. Pat. No. 4,935,886 A1 discloses a plant control system having a plant operation simulator, including an actual plant operation control system and a controller for controlling a simulation of a plant operation in a state that at least a partial function of the actual plant operation control system is off-line.

US2007100478 A1 discloses a system for testing whether a control system is capable of detection and handling of faults, failures or failure modes in a petroleum process plant.

BOP control systems based on MUX technology depend on proper functioning of a number of computer systems and the interfacing of these systems through interface electronics and communication cables. The BOP control systems go through extensive testing in connection with the Factory Acceptance Test (FAT) and in connection with commissioning during installation at the rig.

Existing test methods involves running through different operator commands to see if the BOP control system performs the specified functions. Moreover, some failure situations can be set up to verify that the BOP control system can handle such failure situations.

SUMMARY OF THE INVENTION

The invention is defined in the attached claims. An important feature of the invention is to use simulators and connect to the different parts of the multiplexed BOP control system to test that:

The functions of the multiplexed BOP control system run according to specifications, rules and regulations and that failure situation are handled adequately and effectively by the multiplexed BOP control system.

The invention is in an embodiment a test system for a multiplexed BOP control system, wherein said multiplexed BOP control system comprises a first and a second redundant central control unit with respective first and second operator consoles, wherein said central control units are arranged for being connected via a first signal transmission system to respective first and second redundant subsea control systems arranged for being connected to valves and sensors in a subsea BOP, and said test system comprises a control system signal simulator arranged for being connected between one or more of said control units and one or more of said subsea control systems, and further arranged for entirely or partly replacing said first signal transmission system and providing simulated signals between one or more of said control units and one or more of said subsea control systems.

In an embodiment the test system further comprises a BOP valves and sensor simulator arranged for being connected to one or more of said subsea control systems and further arranged for entirely or partly replacing said BOP valves and BOP sensors and providing simulated sensor signals to said subsea control systems.

The invention is also a method for testing a multiplexed BOP control system as described above, comprising;
 entirely or partly replacing said first signal transmission system with a control system signal simulator by connecting said control system signal simulator between one or more of said control units and one or more of said subsea control systems,
 providing simulated signals to zero or more of said control units and zero or more of said subsea control systems from said control system signal simulator.

In an embodiment the method also comprises connecting said BOP simulator to one or more of said subsea control systems and providing simulated BOP signals to said subsea control systems from said BOP simulator.

The communication lines, or the first signal transmission system between the central control units and the subsea control systems is replaced by a control system signal simulator that can be used to modify signals, to introduce signal errors, and to check functionality related to redundancy, and provide modified or simulated signals between the central control unit and the subsea control systems.

The simulated signals may comprise simulated control signals from one or more of said control units to the corresponding subsea control systems. The simulated signals may also comprise signals in the other direction, i.e. simulated sensor signals or other signals from one or more of said subsea control systems to the corresponding control units.

The simulated signals may in an embodiment be modified signals, or signals calculated on basis of a model, or nil signals simulating a broken connection. Modification of the simulated signals may involve e.g. adding noise, such as white noise and introducing roaming and/or jitter and wander. Simulated signals may be calculated based on e.g. a model of the subsea BOP or specific components of the BOP, such as valves and sensors, and/or models of the multiplexed BOP control system etc.

The invention may also be used for remote subsea wells that may be connected to a platform or to an on-shore terminal by flow lines and by umbilical connection systems.

According to an embodiment of the invention, a multiplexed BOP control system with more than two redundant systems may be tested. The third system may then be designated a third color, e.g. green. In an embodiment with e.g., three redundant systems the multiplexed BOP control system further comprises a third redundant central control unit arranged for being connected via said first signal transmission system to a third redundant subsea control system (110) arranged for being connected to valves and sensors in said subsea BOP, and the control system signal simulator arranged for being connected between one or more of said control units and one or more of said subsea control systems, and further arranged for entirely or partly replacing said first signal transmission system and providing simulated signals between one or more of said control units and one or more of said subsea control systems.

An advantage of the invention compared to background art is that a large number of tests can be performed more efficiently, and test can be done without having access to the subsea BOP stack itself. In addition, the simulation based system makes it possible to perform tests that are difficult or even harmful to perform for the actual subsea BOP stack.

An important advantage is that the invention allows for very detailed and extensive testing of redundancy issues, that is, how the control function can be switched from e.g. the blue central control unit to the yellow, and from the blue pod, or subsea control systems to the yellow while the system is in operation. The simulation based approach of the invention allows for detailed inspection of signals that are transferred is such situations, and this can be critical for detecting and diagnosing errors.

FIGURE CAPTIONS

FIG. 1 is an illustration of a marine drilling platform or vessel with a riser, an LMRP a BOP on a wellhead on the seafloor.

FIG. 2. illustrates a multiplexed BOP control system.

FIG. 4 illustrates in a function based block diagram a multiplexed BOP control system Arrangement according to an embodiment of the invention.

DESCRIPTION OF EMBODIMENTS OF THE INVENTION

The invention will now be further described with reference to the accompanying drawings. The drawings are attached for illustration purposes only and should not be construed to limit the scope of the invention which is only limited by the claims.

Figure 1:
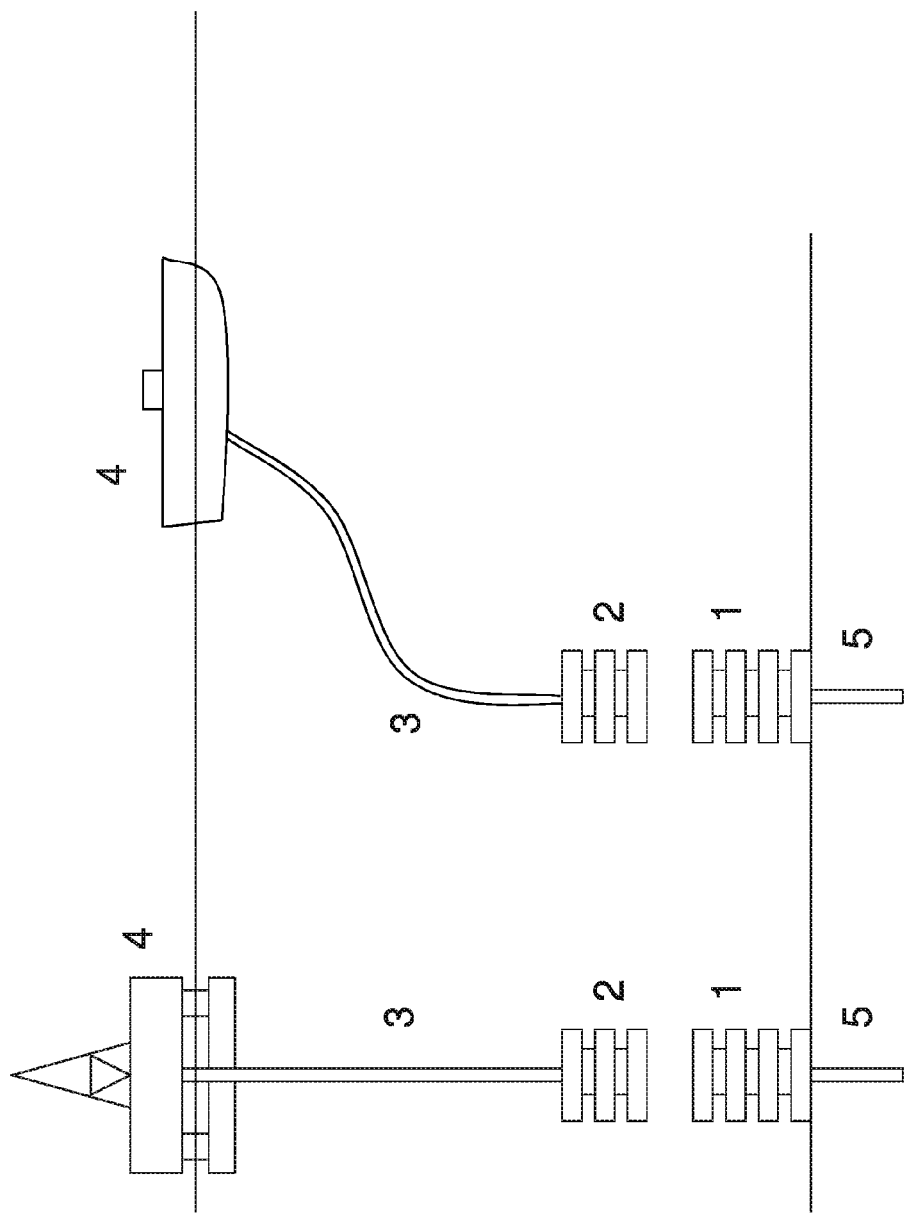

FIG. 1 is an illustration of a marine drilling platform or vessel (4) with a marine riser (3), an LMRP (2) and a subsea BOP on a wellhead (5) on the seafloor as explained under background art previously.

Figure 2:
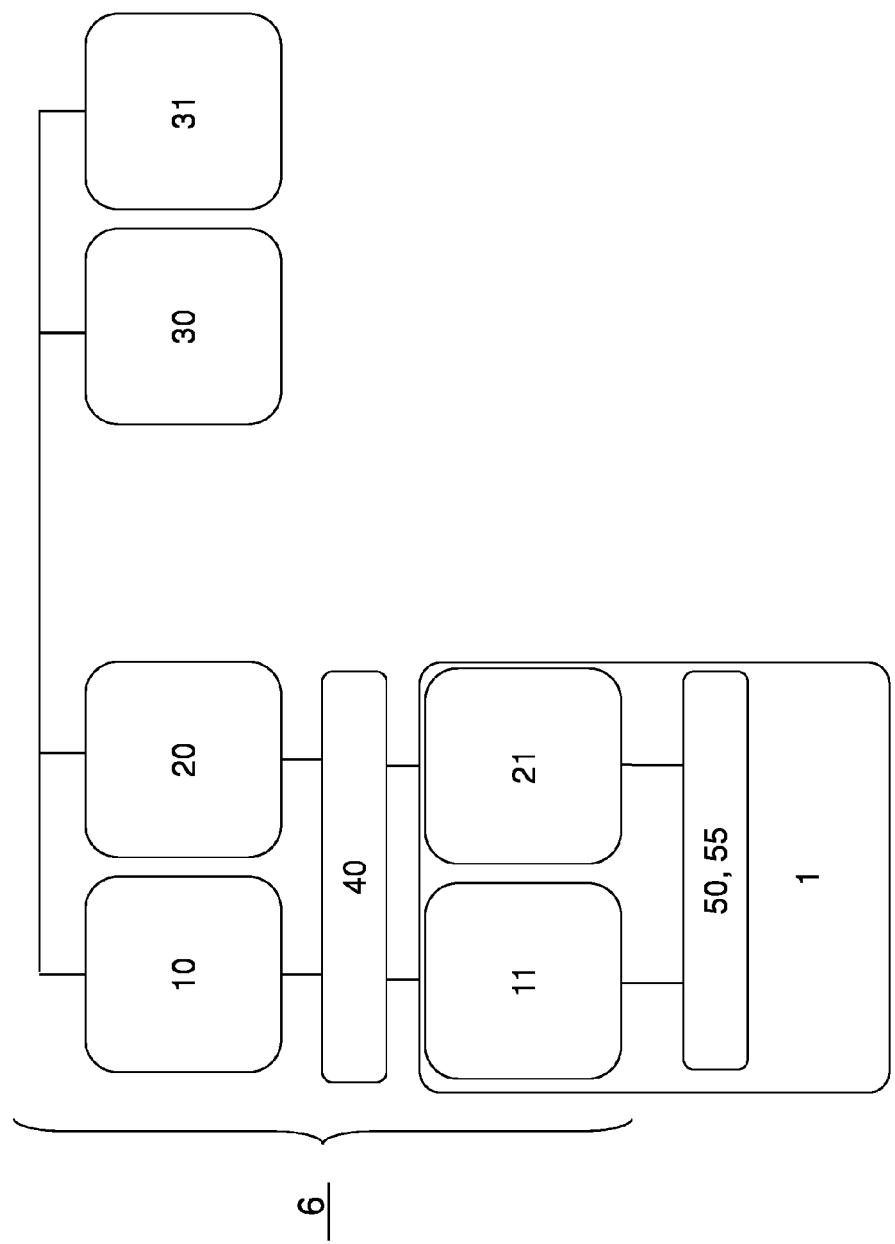

FIG. 2 illustrates a multiplexed BOP control system to be tested by the test system and method according to the invention. On the platform or vessel (4) two identical computer implemented Central Control Units (CCUs) are used, one CCU is designated as the blue system and one CCU is designated as the yellow system. The Central Control Units at the platform communicate with the subsea electronics that comprise two identical subsea control systems, called SEA (Subsea Electronics Assembly), one subsea control systems (11) in a blue control pod on the subsea BOP and the other subsea control systems (21) in a yellow control pod on the subsea BOP.

In an embodiment of the invention the invention is applied to a subsea BOP for a wellhead (5), the BOP for being connected to an LMRP (2) under a marine riser (3) for a floating platform (4) under DP control as shown in FIG. 1. The subsea BOP is mounted on the wellhead (5) of the wellbore, and is connected to the marine riser (3) with the lower LMRP (2). The multiplexed BOP control system is shown in FIG. 2. In this system the "blue" central control unit (10) and the "yellow" central control unit (20), are both located at the platform (4), and connected to a number of operator consoles on the platform (4). The central control units are also connected through a signal transmission system that comprises e.g. serial communication lines and fiber optic communication lines to the "blue" subsea control systems (11) in the "blue pod" and the yellow subsea control systems (21) in the "yellow pod", where the pods are mounted on the subsea BOP and connected to actuators for BOP valves and BOP sensors.

The drilling operators use operator consoles (30, 31), to control the BOP valves of the subsea BOP and receive signals from BOP sensors in the subsea BOP. The operator consoles (30, 31) are connected to the central control units (10, 20) at the floating installation (4). The operators select which of the redundant central control units (10, 20) at the platform and which of the redundant subsea control systems (11, 21) at the subsea BOP (1) that will be used to control the subsea BOP (1).

The multiplexed BOP control system may be used by the operators to the following:

To close (shut in) the well in the case that formation fluids flow into the well and a potential blow out situation is detected.

To open the choke valve of the diverter part of the subsea BOP to let out formation fluids and gas into the riser pipe.

To open the kill line to be able to inject kill mud from the kill line into the wellbore to get control over the well if high-pressure influx from formations into the well is detected To open the main bore through the subsea BOP to let drill pipe, casing or other object through the BOP.

An important feature of the invention is to use simulators and connect to the different parts of the multiplexed BOP control system (6) to test that:

The functions of the multiplexed BOP control system (6) run according to specifications, rules and regulations.

Failure situations are handled adequately and effectively by the multiplexed BOP control system.

In an embodiment of the invention, the multiplexed BOP control system test system is arranged to conduct one or more tests including:

Testing of redundancy handling for Blue and Yellow central control unit.

Testing of power loss and restart capability of the subsea control systems of the SEA pods.

Testing of the Emergency Disconnect Sequence

Testing of acoustic electro-hydraulic POD functions

Testing of PLC control of Field Replaceable Unit (FRU), Hydraulic Power Unit (HPU) and diverter Testing for network storm due to component failures Testing protocols for Input/Output (I/O), network, and operator stations.

Figure 3:
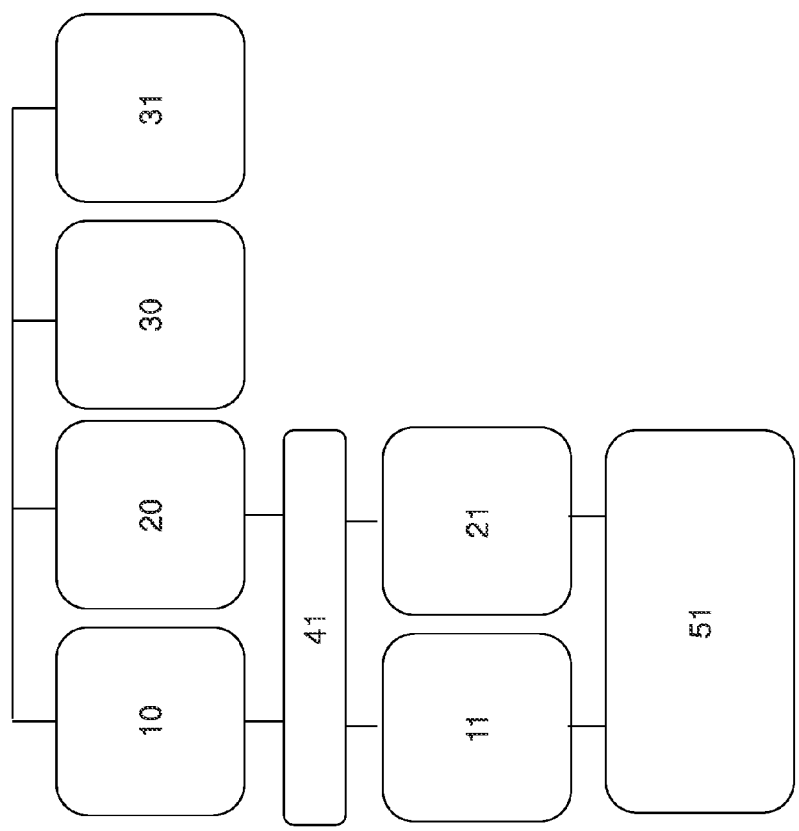
FIG. 3 illustrates in a signal based block diagram a multiplexed BOP control system Test Arrangement according to an embodiment of the invention.

In FIG. 3 a high level view of an embodiment of the invention with emphasis of the test signals is illustrated. Here the simulated signals (41) between the first and second central control unit (10, 20) and first and second subsea control systems (11, 21) are shown. The simulated signals (41) may be two way signals, e.g. control signals from a central control unit (10, 20) to a respective subsea control system (11, 21), and signals from a subsea control system (11, 21) to the respective central control unit (10, 20). Signals internal to the multiplexed BOP control system (6), such as handshaking and protocol specific information may also be part of the simulated signals (41).

FIG. 4 shows an embodiment of the invention, where multiplexed BOP control systems (6) with both two and three redundant BOP control systems are shown. Today redundant systems as described previously with blue and yellow control systems and pods are dominating, and the invention is targeted for testing of such redundant systems. However, the invention may also be used in the same way for testing redundant systems with three or more redundant control systems and pods for a BOP.

According to an embodiment of the invention the multiplexed BOP control system comprises a first and a second redundant central control unit (10, 20) with respective first and second operator consoles (30, 31), wherein said central control units (10, 20) are arranged for being connected via a first signal transmission system (40) to respective first and second redundant subsea control systems (11, 21) arranged for being connected to BOP valves (50) and BOP sensors (55) in a subsea BOP (1), and said test system comprises a control system signal simulator (42) arranged for being connected between one or more of said control units (10, 20) and one or more of said subsea control systems (11, 21), and further arranged for entirely or partly replacing said first signal transmission system (40) and providing simulated signals (41) between one or more of said control units (10, 20) and one or more of said subsea control systems (11, 21).

According to an embodiment the invention involves the testing of the multiplexed BOP control system (6) by connecting the central control units (10, 20) to a control system signal simulator (42) and a BOP valves and sensor simulator (52) that modifies or replaces one or more signals (40) with simulated or modified signals (41) between the central control units (10, 20) and the subsea control systems (11, 21). This is done to conduct tests how the central control units (10, 20) and the subsea control systems (11, 21) in the pods operate and interact in simulated cases of lack of power or in lack of one or more signals, interruptions of signals, disturbance of signals, etc. in the test scenarios mentioned above.

In an embodiment the BOP valves and sensor simulator (52) is arranged so the subsea control systems (10, 20) are connected to a simulated BOP valves and sensors system (52) that receives signals from the subsea control systems (11, 21) in the yellow and/or the blue pods and provides simulated sensor signals (51) from the BOP valves and sensor simulator (52).

According to an embodiment of the invention the test system comprises that said simulated signals (41) are modified signals, or signals calculated on basis of a model, or nil signals simulating a broken connection.

According to an embodiment of the invention the test system comprises a BOP valves and sensor simulator (52) arranged for being connected to one or more of said subsea control systems (11, 21) and further arranged for entirely or partly replacing said BOP valves (50) and/or BOP sensors (55) and providing simulated sensor signals (51) to said subsea control systems (11, 21).

According to an embodiment of the invention the BOP valves and sensor simulator (52) is further arranged for receiving BOP control signals (53) from said subsea control systems (11, 21).

According to an embodiment of the invention the simulated sensor signals (51) are modified signals, or signals calculated on basis of a model of said BOP (1), or nil signals simulating a broken connection.

According to an embodiment of the invention the test system is arranged for testing one or more of the following;
  redundancy handling for first and second redundant central control units and (10, 20),
  power loss and restart capability of the first and second redundant subsea control systems (11, 21),
  testing of Emergency Disconnect Sequence,
  testing of acoustic electro-hydraulic functions of first and second redundant subsea control systems (11, 21),
  testing of PLC control of a FRU, a HPU and diverter,
  testing for network storm due to component failures,
  testing protocols for I/O, network, and operator consoles.

According to an embodiment of the invention the multiplexed BOP control system (6) further comprises a third redundant central control unit (100) arranged for being connected via said first signal transmission system (40) to a third redundant subsea control system (110) arranged for being connected to said BOP valves (50) and said BOP sensors (55), and wherein said control system signal simulator (42) is arranged for being connected between one or more of said control units (10, 20, 100) and one or more of said subsea control systems (11, 21, 110), and further arranged for entirely or partly replacing said first signal transmission system (40) and providing simulated signals (41) between one or more of said control units (10, 20, 100) and one or more of said subsea control systems (11, 21, 110).

In an embodiment the invention is a method for testing a multiplexed BOP control system wherein said multiplexed BOP control system comprises;
  a first and a second redundant central control unit (10, 20) with respective first and second operator consoles (30, 31), wherein said central control units (10, 20) are connected via a first signal transmission system (42) to respective first and second redundant subsea control systems (11, 21) connected to BOP valves (50) and BOP sensors (55) in a subsea BOP (1),
said method comprising;
  entirely or partly replacing said first signal transmission system (40) with a control system signal simulator (42) by connecting said control system signal simulator (42) between one or more of said control units (10, 20) and one or more of said subsea control systems (11, 21),
  providing simulated signals (41) to zero or more of said control units (10, 20) and zero or more of said subsea control systems (11, 21) from said control system signal simulator (42).

According to an embodiment of the invention the method comprises connecting a BOP valves and sensor simulator (52) to one or more of said subsea control systems (11, 21) and providing simulated sensor signals (51) to said subsea control systems (11, 21) from said BOP simulator (52).

According to an embodiment of the invention the method comprises receiving BOP control signals (53) from said subsea control systems (11, 21) in said BOP simulator (52).

According to an embodiment the invention is a test system for a multiplexed BOP control system (6) comprising;
  first and second redundant surface central control system CCU (10, 20) with operator consoles (30, 31) arranged for being arranged on a surface vessel (4) and for being connected via a signal transmission system (40) to first and second redundant subsea control systems SEA (11, 21) arranged for being connected to send and receive control and sensor signals (50) to valves in a subsea BOP (1),
further comprising: a signal simulator (42, 52) arranged for being connected between one or more of said surface control systems (10, 20) and one or more of said subsea control systems (11, 21), said signal simulator (42, 52) arranged for entirely or partly replacing said signal transmission system (40) and providing simulated signals (41) between one or more of said surface control systems (10, 20) and one or more of said subsea control systems (11, 21).

According to an embodiment the invention the signal simulator (42, 52) includes that the pods (11, 21) are connected to a simulated BOP valves and sensors system (52) that receives signals from the yellow and/or the blue pods (11, 21) and provides simulated sensor signals (51) from the simulated BOP valves and sensors (52).

The invention claimed is:

1. A test system for a multiplexed Blow Out Preventer (BOP) control system, wherein said multiplexed BOP control system comprises a first and a second redundant central control unit with respective first and second operator consoles, and further comprises first and second redundant BOP control pods arranged for being connected to BOP valves and BOP sensors of a subsea BOP stack, wherein said central control units are arranged for being connected via a first signal transmission system to respective said first and second redundant subsea control systems, and said test system comprises a control system signal simulator arranged for being connected between one or more of said control units and one or more of said subsea control systems, and further arranged for replacing said first signal transmission system and providing simulated signals calculated on basis of a model of said BOP sensors between one or more of said control units and one or more of said subsea control systems, said test system further comprising a BOP valves and sensor simulator arranged for being connected to one or more of said subsea control systems and further arranged for replacing said BOP valves and BOP sensors and providing simulated sensor signals to said subsea control systems.

2. The test system of claim 1, further comprising that said simulated signals are modified signals or nil signals simulating a broken connection.

3. The test system of claim 1, wherein said BOP valves and sensor simulator is further arranged for receiving BOP control signals from said subsea control systems.

4. The test system of claim 1, further comprising that said simulated sensor signals are modified signals, or signals calculated on basis of a model of said BOP, or nil signals simulating a broken connection.

5. The test system of claim 1, arranged for testing one or more of the following;
redundancy handling for said first and second redundant central control units,
power loss and restart capability of said first and second redundant subsea control systems,
testing of Emergency Disconnect Sequence,
testing of acoustic electro-hydraulic functions of said first and second redundant subsea control systems,
testing of Programmable Logic Controller (PLC) control of a Field Replaceable Unit (FRU), a Hydraulic Power Unit (HPU) and diverter,
testing for network storm due to component failures,
testing protocols for Input/Output (I/O), network, and operator consoles.

6. The test system of claim 1, wherein said multiplexed BOP control system further comprises a third redundant central control unit arranged for being connected via said first signal transmission system to a third redundant subsea control system arranged for being connected to said BOP valves and said BOP sensors, and wherein said control system signal simulator is arranged for being connected between one or more of said control units and one or more of said subsea control systems, and further arranged for replacing said first signal transmission system and providing simulated signals between one or more of said control units and one or more of said subsea control systems.

7. A method for testing a multiplexed BOP control system wherein said multiplexed BOP control system comprises; a first and a second redundant central control unit with respective first and second operator consoles, and further comprises first and second redundant BOP control pods arranged for being connected to BOP valves and BOP sensors of a subsea BOP stack, wherein said central control units are connected via a first signal transmission system to respective said first and second redundant subsea control systems, said method comprising; replacing said first signal transmission system with a control system signal simulator by connecting said control system signal simulator between one or more of said control units and one or more of said subsea control systems, providing simulated signals calculated on a basis of a model of said BOP sensors to one or more of said control units and one or more of said subsea control systems from said control system signal simulator, and connecting a BOP valves and sensor simulator to one or more of said subsea control systems and providing simulated sensor signals to said subsea control systems from said BOP simulator.

8. The method according to claim 7, comprising the following step;
receiving BOP control signals from said subsea control systems in said BOP simulator.

* * * * *